Feb. 26, 1929.  
J. G. DONALDSON  
1,703,417  
METHOD OF MAKING COMPOSITE ARTICLES FOR SAFE OR VAULT CONSTRUCTION  
Original Filed June 7, 1921
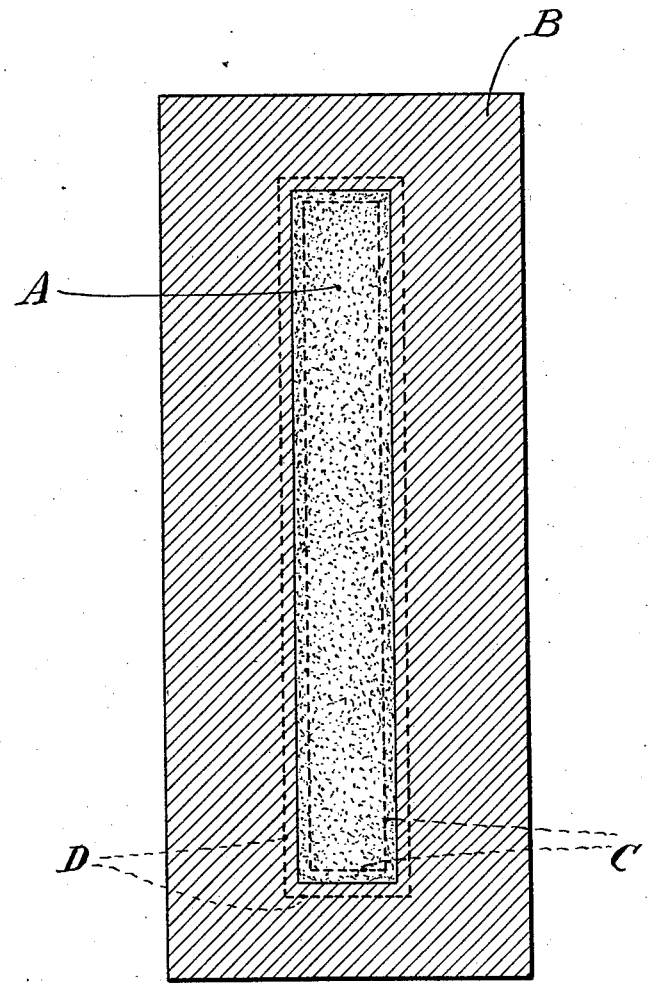
INVENTOR  
Joseph G. Donaldson  
BY  
ATTORNEY Patented Feb. 26, 1929.

1,703,417

UNITED STATES PATENT OFFICE.

JOSEPH G. DONALDSON, OF HAMILTON, OHIO, ASSIGNOR TO GUARDIAN METALS COMPANY, OF HAMILTON, OHIO, A CORPORATION OF DELAWARE.

METHOD OF MAKING COMPOSITE ARTICLES FOR SAFE OR VAULT CONSTRUCTION.

Original application filed June 7, 1921, Serial No. 478,220. Divided and this application filed July 3, 1926. Serial No. 120,528.

Primarily this invention concerns a new article of manufacture consisting of, or including, a suitable metal, such as iron, and a highly refractory material in (preferably) permanent association therewith such as would result from alloying the latter, or a part thereof, with the former, or a part thereof, or from enclosing the latter within the former or from otherwise uniting the two over and throughout the whole or a substantial part of their contacting surfaces. The object is to obtain what I shall term herein a metal which shall have one or more of certain desirable characteristics including, chiefly, (a) resistance to cutting or melting by the application of high heat such, for example, as that of the oxy-acetylene or the oxy-hydrogen torch or the electric arc, (b) resistance to mechanical cutting or penetrating as, for example, by means of a drill or other tool or device, and (c) ductility combined with a high degree of hardness, considering the metal as a whole.

The properties of the metal herein disclosed are such as to adapt it for use in many fields. One of these is the safe and vault field in which all of the characteristics above mentioned are of commanding importance. The primary essential of an ideal metal for use in this field is that it shall be immune from burglarious attack either by the drill or the torch. Prior to this time, so far as I am aware, such a metal, although widely sought, has not been developed despite urgent and long-recognized need thereof in the field mentioned. There are, it is true, substances which are measurably resistant to attack by high heat, but these succumb to attack by the drill. There are also substances which are measurably resistant to attack by the drill, but these succumb to attack by high heat. A metal, particularly a ductile metal, which is immune from attacks of both sorts, as encountered in the safe and vault field, has not, so far as I am aware, heretofore been produced. A material having this characteristic is the subject and result of this invention.

Under my invention a material is produced which, as desired, may be cast in any ordinary manner, or, if ductile, rolled, stamped, forged or otherwise fashioned into any suitable forms or shapes. It can be made unmachinable, by which is meant that it may not be mechanically penetrated as by drilling. It is highly heat-resistant, being immune from attack, certainly during any period of time permissible in burglarious safe or vault opening, either by the slow and laborious process of melting or by the swifter and more efficacious process of cutting by means of the torch or arc.

Again, under my invention it is possible to realize in a plate or billet of metal which is, for all practical purposes, integral, all or certain of these characteristics or properties while still preserving, in whole or in part, the physical qualities of the components employed.

In the following specification I shall disclose, without limiting myself thereto, a preferred practice of the invention as involved in the production of plates, either cast or wrought, suitable for use, for example, in the construction of safes and vaults.

I employ, preferably in conjunction with iron (in one of its several forms) either alone or associated with another or other metals such, for example, as copper, etc., a material of high refractory power. Of this material there are many varieties differing from each other, among other things, in their resistance to heat, to penetration, to compressibility, etc., I prefer to employ what I shall designate herein as zirconium (using this word herein in a generic sense to include the family or group of substances known under various names such as zirconium ore, zirconia, zircon, zirconium silicate, Baddeleyite, zirconium oxide, zircon-alba, zircon-sand, zirkite, etc.), having, if desired, carbon in association therewith. Excellent results can be obtained under my invention, not only with the carbide of zirconium (as above defined) but also with the carbide of other materials, such, for example, as molybdenum, boron, etc. This refractory material is preferably employed in pulverulent or comminuted state and such state may characterize its original form (as zircon or zircon-sand), or may be realized, if the original form be solid, (as might be the case with Baddeleyite) by a crushing or equivalent process. In some instances and for some purposes, it may be desirable to melt the zirconium and then, after cooling, reduce it to powdered form in the manner above stated.

This comminuted zirconium I form into a core and by this I mean a body (or several bodies) of said material to be subsequently associated with iron either by being embedded therein or secured thereto. With an integral mass of metal may be so associated a plurality of such cores, the same forming strata therein, separated, if desired, by such metal. In forming the core I may use the refractory (such as zirconium) alone as where it has previously been melted and poured in the form of a coherent mass. Or, I may unite with the refractory a binder of suitable material the precise character of which will vary with the particular form of refractory employed. Generally speaking, the binder, if not alloyed with or sintered to the refractory, should have a higher melting point than the available heat of the means of attack (such as the torch), since otherwise, should the core be attacked by high heat in combination with a high pressure of oxygen, the grains of such refractory material might be blown out and the effort to penetrate facilitated. A binder of refractory material, such as graphite, will give excellent results. Such a core would have the formula (by way of example):—zirconia 100 parts, iron (powdered) 20 parts, graphite 20 parts. The iron may, however, be omitted. Also, it may be found desirable to mix with the powdered zirconium iron or copper and carbon, also in powdered form, the particles being bound together by sodium silicate, and to then heat the core until alloying or sintering results. A typical core having such a metallic binder would have the formula:—zirconia 100 parts, copper powder 10 parts, coke powder 10 parts, sodium silicate sufficient to make the particles cohere while the core is being formed.

In preparing the core, I may, depending upon the particular refractory employed, reinforce the same with suitable rods. I also, when heating the core, vent the same to provide for the escape of gases, the vent hole, if desired, being subsequently closed in any suitable manner. In addition to heating the core for the purpose described, the same may also be compressed and this may be an independent operation or, when the core is embedded in encasing metal as hereinafter described, the manipulation of the whole, as by rolling, will answer the purpose. In either case, all moisture in the core is expelled and the mass firmly compacted and hardened. If desired, I may melt the zirconia either alone or in admixture with other substances, such as one or more of those above referred to, using for this purpose an electric furnace, and then pour the melt into a suitable mold. The core, on being taken from the mold and before being thoroughly cooled, may be subjected to pressure for the purpose above set forth. Should the contraction of the core due to cooling develop cracks of such magnitude as to make it unsuitable for use, it may be reheated or remelted and again cooled until a sound core is produced.

The next step in the process is to place one or more of the cores formed as above described in a mold, holding the same in place by chaplets, and to pour molten metal (such as iron, for example) around them. The ingot thus formed may then, before cooling, or subsequently after reheating, be rolled or forged in usual manner. This process of uniting the core or cores and encompassing metal is accompanied by certain phenomena which will be hereinafter described.

In the accompanying drawing is illustrated the (somewhat conventionalized) cross-section of a plate or ingot made in accordance with my invention, showing its general appearance before rolling or forging. Here the core is illustrated at A and the encompassing material at B. There may, as above indicated, be a single core (as here shown) or a plurality of cores. If the latter, they may be continuous and substantially parallel or staggered with relation to each other.

The main steps in the process under disclosure have been above generally indicated but not the resulting phenomena by which those steps, or certain of them, are accompanied. Imprimis, in the formation of the core, where there has been mixed with the zirconia an alloyable material such as iron turnings or filings, comminuted copper, etc., the application of heat results in alloying or sintering the materials employed. There is also a tendency toward expressing from the interior of the core any impurities within the mass, these forming on or adjacent to the surface an extremely hard and practically impenetrable scale or slag, indicated by C on the accompanying drawing. When the core, either cold or with its temperature suitably raised preliminarily to its being combined with the encompassing metal, is placed in the mold and such metal flowed about it, such core is, of course, subjected to high heat and in addition, incident to the setting and cooling of the encompassing metal, to a high degree of pressure, such pressure being exerted by the rapidly cooling outside metal. This promotes the formation of the scale or slag on the surface of the core. In addition, to some extent, the metal tends to be driven into the core. At the point of union and over an area, D, of substantial thickness a ferro-zirconium alloy is formed, the result being, therefore, a permanent joining of the core and the outside metal by means of a substance which partakes of the characteristics of both but which is, in fact, neither, being an alloy of both iron and zirconium. This alloy, which forms regardless of whether a flux has been used or not, is of extreme hardness, as is also the strata of scale or slag lying between it and the center of the core. Although I have described this phenomenon as incident to the combining of the core with the outside metal, it also takes place (or having already taken place is furthered) by the process of rolling or forging the plate, for which purpose, of course, the plate is maintained at high heat. Under the rolling or forging operation, the core behaves practically as would a piece of metal of the same size, position and shape. It conforms to the changing shape of the plate and is reduced in thickness in substantially the same proportion as the other parts of the composite whole. Its final thickness, like that of the thickness of the entire plate, is thus within the control of the operator.

I do not consider it essential that the core herein disclosed (minus the binder, if one be employed) be of a single material, as two or more refractory substances may be employed each of which may possess some quality not present in the other. Thus I may use a core of zirconia (either with or without a binder or other admixture) enveloped in a jacket of pulverized chromium held together by a suitable binding agent, such as sodium silicate, which would soften under heat so that when the outside metal is flowed around the core the envelope of chromium will alloy with such metal, thus forming a drill-resistant layer immediately in contact with a layer resistant to high heat, such as that of the torch or arc.

In some instances, it may be desirable to encompass a core or cores made hereunder in a metal which is of itself resistant to mechanical attack, as by drilling. This may readily be done by employing, for example, Hadfield's manganese steel for the outside metal, the same acting, in the case of attack, as the first line of defense. Also in some instances it may be desirable either to combine with the refractory material heretofore specified as preferred or to wholly substitute therefor a material which is not only refractory but which, in addition, is a good conductor of heat. Such a material is illustrated by graphite or gas-carbon. A core so constructed will reduce the available heat of the blowtorch by conducting away from the point of attack a part of the heat of the torch.

Again, it is within my invention to construct a core of a suitable refractory material such as one of those hereinbefore mentioned and containing or not containing a binder or other admixture as may be desirable or necessary and, by the process of cementation or otherwise, provide the same with an intensely hard exterior through the use of carbon, such exterior in this case consisting of the carbide of the core material or of a substantial part thereof. Thus, by way of example, I mean to include herein a core which, either throughout its mass or as to its exterior only, shall consist of, or include, zirconium carbide, molybdenum carbide, boron carbide, etc. A suitable carbon for this purpose is graphite, coke, coal, etc., used preferably in powdered form. With certain core materials, silicon may to advantage be used in addition to the carbon.

While it is contemplated herein that the core, whether one or more and whether having or not having an envelope of alloyable material, shall be of substantial mass, capable, if desired, of reduction in thickness by rolling, in some instances, as, for example, in the construction of plates which are not to be substantially reduced in thickness as a whole, the refractory material may be economized, only sufficient being employed to alloy with the encompassing iron or with the envelope (if one be employed), or both, forming thereby an impenetrable barrier not only to the torch but also to the drill. Also, if desired, a sheet of metal may be brought to a high heat, its upper surface sprinkled with the core material such as hereinbefore described, which will thereupon unite with such metal. Also, the sheet so sprinkled may, if desired, be folded upon itself, to bring the treated surface inside, after which the folded sheet, either after being further heated or not, may be rolled or forged, the resultant product being a sheet of ductile metal having within it a hard, drill-proof and torch-resistant material suitable for use, for example, as lining for safes, vaults and the like.

The above and many other variations in, or departures from, the procedure as disclosed herein may readily be practiced within the scope of my invention. I have above referred to the broad and generic sense in which, in this application, I make use of the word "zirconium". Out of abundant caution, I note that while I also refer for convenience to a plate, billet or ingot employing the invention herein set forth as a metallic article, this does not necessarily mean that the whole of the article, including the core, is metallic, as cores having certain or all of the essential characteristics as herein specified may, within my invention, be made of material either in whole or in part non-metallic.

I claim:—

1. The process of producing metallic articles for safe or vault constructions which involves forming a core, a substantial part of which is zirconium oxide and the remainder of zirconium silicate and graphite, fusing the same, cooling, heat treating, and encompassing the same while hot by molten metal.

2. The process of producing metallic articles for safe or vault constructions which involves forming a core, a substantial part of which is zirconium oxide and the remainder of zirconium silicate and graphite, fusing the same, cooling, pouring a molten metal around said core to thereby form an alloy zone at the areas of contact.

3. The process of producing metallic articles for safe or vault constructions which involves forming a core, a substantial part of which is zirconium oxide and the remainder of zirconium silicate and graphite, mechanically compacting the same, fusing, cooling, heat treating, and encompassing the same while hot by molten metal.

4. The process of producing metallic articles for safe or vault constructions which involves forming a core, a substantial part of which is zirconium oxide and the remainder zirconium silicate and graphite, and subjecting the core to the action of a molten metal under determined conditions permitting the reduction of the surface coating of the core and the alloying of the metallic surface formed with the encompassing metal.

5. The process of producing metallic articles for safe or vault constructions which involves forming a core, a substantial part of which is zirconium oxide and the remainder of zirconium silicate and graphite, encompassing said core with molten iron whereby the core and the metal at the areas of engagement alloy to form an alloy zone, said alloy zone being resistant to drills and local high heat to a greater extent than the encasing metal.

This specification signed this 29 day of June, 1926.

JOSEPH G. DONALDSON.